United States Patent [19]
Tytke

[11] Patent Number: 4,609,571
[45] Date of Patent: Sep. 2, 1986

[54] PRIMER SYSTEM FOR GREASE REPELLANT PAPERS

[75] Inventor: Edward W. Tytke, Savannah, Ga.

[73] Assignee: Union Camp Corporation, Wayne, N.J.

[21] Appl. No.: 699,260

[22] Filed: Feb. 7, 1985

[51] Int. Cl.$^4$ .............................................. B05D 5/10
[52] U.S. Cl. ............................... 427/208.2; 427/208.8; 427/265; 427/285; 427/288; 427/303; 427/326; 428/200; 428/349; 428/351; 428/354; 428/514; 493/189
[58] Field of Search ................... 427/326, 208.8, 208.2, 427/411, 265, 288, 303, 285; 428/514, 260, 349, 351, 354; 383/52, 94; 493/189

[56] References Cited

U.S. PATENT DOCUMENTS

| | | |
|---|---|---|
| 3,296,011 | 1/1967 | McBride et al. ................ 427/208.2 |
| 4,256,526 | 3/1981 | McDaniel ....................... 427/208.2 |
| 4,536,012 | 8/1985 | Hume ............................. 427/208.2 |

FOREIGN PATENT DOCUMENTS 59-206477  11/1984  Japan ................................ 427/208.2

Primary Examiner—Norman Morgenstern
Assistant Examiner—Janyce A. Bell
Attorney, Agent, or Firm—Kane, Dalsimer, Kane, Sullivan and Kurucz

[57] ABSTRACT

The disclosure is of the use of a primer formulation comprising styrene/butadiene rubber, water and alcohol that is employed to promote hot melt adhesion of fluorocarbon treated grease resistant papers, which are used in storage bags and containers for such products as pet foods, for example.

12 Claims, No Drawings

PRIMER SYSTEM FOR GREASE REPELLANT PAPERS

BACKGROUND OF THE INVENTION

1. Field of the Invention

The invention relates to methods and compositions for increasing the adhesiveness of grease repellant papers and more particularly to the use of styrene/butadiene rubber emulsion as a priming system.

2. Brief Description of the Prior Art

Paper containers used in the packaging industry for distribution and storage of food products are commonly made with paper that has been treated with a fluorocarbon sizing agent that makes the paper grease-repellant. This prevents wicking or staining that occurs on non-treated papers with high grease or high fat content products, such as for example, pet foods. Paper thus treated with the fluorocarbon material becomes resistant to hot melt adhesives applied for the purpose of bonding paper to paper closures. The sealing must be such that assures strong closures and presents product siftage.

Paper to paper bonding with good shear, peel and tearing properties of such containers is of considerable industrial importance and consequently there is a great deal of work done in this area of technology. For example, U.S. Pat. No. 3,313,218 describes a method for joining waxed paperboard surfaces whereby glue is heated to an extremely high temperature before application to the waxed surface. In this method, the superheated glue melts the wax, allowing for adhesion of the two waxed surfaces. In other prior art methods, a claycoat is used for improvement of adhesion of grease resistant surfaces.

The present invention is an improvement over prior art methodology in promoting both good sealing and fiber tear properties without resort to drastic conditions, such as the use of very high temperatures. The method consists of first priming the surfaces to be sealed with an emulsion of butadiene/styrene rubber, (SBR), and then applying a hot melt adhesive.

SUMMARY OF THE INVENTION

The invention comprises a method of increasing the adhesive reception of grease-repellant papers, which comprises:
priming the paper with styrene/butadiene rubber emulsion.

The invention also comprises a primer formulation which comprises styrene/butadiene rubber, water and alcohol.

The primer formulations are most effective in promoting good bonding where fluorocarbon treated grease repellant paper is used and the adhesive is a hot melt.

DETAILED DESCRIPTION OF THE INVENTION

The invention is based on the discovery that priming grease-repellant papers with an emulsion of styrene/butadiene rubber (SBR) increases their surface affinity and penetrability of hot melt adhesives which results in good adhesive bonds. The priming is especially effective with grease-repellant papers such as those treated with fluorocarbon compounds.

The method of the invention is carried out by applying a primer coat of the SBR to the hot melt adhesive area of grease repellant paper used as the outer ply of for example, a pinch bottom open mouth bag, such as is employed in pet foods. The method is most effective with polyethylene based hot melts. The SBR is mixed with water and alcohol. The proportions of SBR, water and alcohol may be varied to some degree but are most preferably in a ratio of SBR:water:alcohol of 1:1:2 by volume. The preferred alcohol is ethyl alcohol and the proportion of styrene to butadiene is 63:37 by weight. The ethyl alcohol serves to permit the primer to penetrate the paper. The water based SBR emulsion will not wet the paper in the absence of alcohol. The latter also speeds up the drying time of the emulsion. As it penetrates, the SBR bonds to the grease resistant, fluorocarbon paper, providing a surface that will permit adhesion by hot melt adhesives, thus allowing for effective closure of pinch bottom open mouth bags.

The formulation was evaluated for strength of bonding by observing fiber tear of the bonded surfaces at different temperatures after the seals were made with a hot melt adhesive. In one type of evaluation, Tables 1 & 2, the performance of control paper (regular bleached multiwall), fluorocarbon treated and primer treated papers were comparatively evaluated for bond strength at different hot melt temperatures and dwell times to find the sealing parameter to obtain good bonds. The primer formulations when applied to the fluorocarbon sheets showed an improvement in fiber tear after sealing when compared to the non-primed fluorocarbon treated sheets. The primed sheets averaged one (1) second or more shorter dwell time than the non-primed fluorocarbon paper. The primed sheets also averaged about ½ of a second longer dwell time than non-primed, non-fluorocarbon treated regular bleached paper.

In another evaluation, (Table 3), an increase in fiber tear on the primed samples was observed as compared to the bleached supercalendered fluorocarbon treated base sheets.

The primer system of the invention can be easily manufactured from readily available materials. It is considerably less expensive over the prior art use of a claycoat that is applied to increase adhesion of pet food pinch bags. The primer system promotes strong sealing of bags and containers where strong and siftproof bag closures are mandatory to satisfactorily contain the product through filling and transportation systems for such products as pet foods. The primer system allows for good tearing properties, as is demonstrated by fiber tear performance.

The method of applying the primer system can be used commercially employing conventional machinery.

The following examples describes the manner and process of making and using the invention and set forth in best mode contemplated by the inventor of carrying out the invention but are not to be construed as limiting.

PREPARATION OF PRIMER SYSTEM

To 20 ml of styrene/butadiene (SBR) emulsion which contains 51–53% solids and whose styrene/butadiene ratio is 67:33 by weight, were added 20 ml of $H_2O$ and 40 ml of ethyl alcohol.

The volume ratios of the SBR emulsion:water:alcohol; in this preparation is 1:1:2.

METHOD OF APPLICATION

The primer system will be sprayed onto the hot melt adhesive application area of pinch bottom open mouth bags that have a fluorocarbon treated outer ply. The spray application rate is approximately 1 g per hot melt adhesive application area of the bag.

TABLE 1

SBR PRIMER SYSTEMS

| Temperature (°F.) | Dwell (Sec) | Test Sheet Description |  |  |
|---|---|---|---|---|
| | | Regular Bleached Kraft | Bleached Supercalendered Fluorocarbon Treated Kraft | Bleached Supercalendered Fluorocarbon Treated Kraft Primed with SBR Solution |
| 190 | 1 | No tear | No tear | No tear |
| | 1½ | " | " | " |
| | 2 | " | " | " |
| | 2½ | " | " | " |
| | 3 | " | " | " |
| | 3½ | " | " | " |
| | 4 | Slight tear | " | " |
| | 4½ | " | " | Slight tear |
| | 5 | Good tear | " | Good tear |
| | 5½ | " | " | " |
| | 6 | " | Slight tear | " |

Procedure - Simulated pinch bottom mouth bag closures were made by applying a ¾" wide band of a polyethylene based hot melt adhesive onto a 1" wide strip of kraft paper. The hot melt strip was then placed onto a 2" wide test sheet and placed in a Sentinel Heat Sealer set at 20 psig. Pressure was kept on the sample until cool. The sample was then peeled apart and evaluated.

TABLE 2

SBR PRIMER SYSTEMS

| Temperature (°F.) Actual | Dwell (Sec) | Test Sheet Description |  |  |
|---|---|---|---|---|
| | | Regular Bleached Kraft | Bleached Supercalendered Fluorocarbon Treated Kraft | Bleached Supercalendered Fluorocarbon Treated Kraft Primed with SBR Solution |
| 200 | 1 | No tear | No tear | No tear |
| | 1½ | " | " | " |
| | 2 | " | " | Slight tear |
| | 2½ | " | " | " |
| | 3 | Slight tear | " | Good tear |
| | 3½ | Good tear | Slight tear | " |
| | 4 | " | " | " |
| | 4½ | " | " | " |
| | 5 | " | Good tear | " |
| | 5½ | " | " | " |
| | 6 | " | " | " |

Procedure - Simulated pinch bottom mouth bag closures were made by applying a ¾" wide band of a polyethylene based hot melt adhesive onto a 1" wide strip of kraft paper. The hot melt strip was then placed onto a 2" wide test sheet and placed in a Sentinel Heat Sealer set at 20 psig. Pressure was kept on the sample until cool. The sample was then peeled apart and evaluated.

TABLE 3

SBR PRIMER SYSTEMS
EVALUATION OF FIELD CONDITIONS

| Hot Melt Reactivation Temperature (°F.) | Test Sheet Description |  |  |
|---|---|---|---|
| | Regular Bleached MWK | Bleached Supercalendered Fluorocarbon Treated Kraft | Bleached Supercalendered Fluorocarbon Treated Kraft Primed with SBR Solution |
| 270 | 30% fiber tear | No seal | No seal |
| 325 | 100% tear | " | " |
| 390 | " | Poor | Poor |
| 425 | " | Poor | 50% |
| 450 | " | Poor | 50% |
| 580 | " | 20% Fiber tear | 50% |
| 500 | " | 50% | 70% |
| 520 | " | 50% | 100% |

The above data represents actual field conditions for pinch bottom open mouth bags. A strip (2" × 10") of the test sheet is placed into the hot melt adhesion area of a pinch bottom open mouth bag. The bag with the test sheet is run through an actual closing unit at the described temperature. The closed bag is permitted to cool and the effectiveness of the closure is measured by the amount of fiber tear present.

What is claimed is:

1. A method of increasing the adhesive reception of a grease-repellant paper comprising a sheet of cellulosic paper that has been treated with a fluorocarbon sizing agent, which comprises;
   providing said paper comprising a sheet of cellulosic paper that has been treated with a fluorocarbon sizing agent;
   priming the surface of the provided treated paper with a mixture consisting essentially of a water emulsion of styrene/butadiene rubber and alcohol; and
   applying adhesive to primed surface of said paper.
2. The method of claim 1 wherein the adhesive is a hot-melt adhesive.
3. The method of claim 1 wherein the provided paper is an outer ply of a pinch bottom open mouth bag.
4. A primer composition which consisting essentially of; a styrene/butadiene emulsion, water and alcohol.
5. The composition of claim 4 wherein the alcohol is ethyl alcohol.
6. The composition of claim 4 wherein the ratio of styrene to butadiene is 67 to 33 (weight to weight).
7. The composition of claim 6 wherein the proportions of styrene/butadiene:water:ethyl alcohol are 1:1:2 (by volume).

8. In a method of increasing the adhesive reception of grease-repellant paper comprising a sheet of paper that has been treated with a fluorocarbon sizing agent, which comprises priming said paper with styrene/butadiene rubber, the improvement, which comprises; applying the rubber to the paper in a mixture consisting essentially of the styrene-butadiene rubber, water and an alcohol.

9. The method of claim 8 wherein the alcohol is ethyl alcohol.

10. The method of claim 9 wherein the ratio of syrene to butadiene is 67:33 (weight to weight).

11. The method of claim 10 wherein the proportions of styrene/butadiene:water:ethyl alcohol are 1:1:2.

12. The method of claim 9 wherein the adhesive is a hot-melt adhesive.

* * * * *